United States Patent [19]

Fukuda et al.

[11] 4,252,925
[45] Feb. 24, 1981

[54] ANIONIC POLYMERIZATION PROCESS

[75] Inventors: Mitsutoshi Fukuda; Kazuo Tago; Akihiko Shimizu, all of Shin-nanyo, Japan

[73] Assignee: Toyo Soda Manufacturing Co., Ltd., Yamaguchi, Japan

[21] Appl. No.: 18,748

[22] Filed: Mar. 8, 1979

[30] Foreign Application Priority Data

Apr. 19, 1978 [JP] Japan ................................. 53/45262

[51] Int. Cl.$^3$ ............................ C08F 4/46; C08F 4/48; C08F 4/50
[52] U.S. Cl. .................................... 526/77; 526/173; 526/174; 526/175
[58] Field of Search ................... 526/173, 174, 175, 77

[56] References Cited

U.S. PATENT DOCUMENTS

| | | | |
|---|---|---|---|
| 3,265,680 | 8/1966 | Forman et al. | 526/173 |
| 3,949,020 | 4/1976 | Prudence | 526/174 |
| 4,048,420 | 9/1977 | Francois et al. | 526/173 |
| 4,104,455 | 8/1978 | Nagasawa et al. | 526/173 |
| 4,146,693 | 3/1979 | Beauregard | 526/173 |

*Primary Examiner*—William F. Hamrock
*Attorney, Agent, or Firm*—Oblon, Fisher, Spivak, McClelland & Maier

[57] ABSTRACT

An anionic polymerization is carried out by polymerizing a monomer for anionic polymerization in a solvent in the presence of a polymerization initiator after preparing a polymerization system by an operation (I) adding a solution of an organometallic compound in a polymerization system of a solvent or a combination of a solvent and an inert gas and an operation (II) removing excess of the unreacted organometallic compound, before charging the monomer and the polymerization initiator.

15 Claims, No Drawings

ANIONIC POLYMERIZATION PROCESS

BACKGROUND OF THE INVENTION

1. Field of the Invention

The present invention relates to a novel anionic polymerization for polymerizing a monomer in a solvent in the presence of a polymerization initiator. More particularly, it relates to an anionic polymerization for producing a polymer having an average molecular weight being substantially the same with the predetermined one, in high reproducibility by substantially removing a polymerization inhibitor in the polymerization system by a special manner before charging the monomer and the polymerization initiator.

2. Description of the Prior Arts

A living anionic polymerization is a significantly important polymerization process for producing a block or graft copolymer for a thermoplastic elastomer; an oligomer having both terminal functional groups being useful as a liquid elastomer or a polymer having uniform molecular weights useful as a macromolecular standard for determining molecular characteristics.

In an ideal living anionic polymerization in the absence of any side reaction beside the initiation and the propagation reaction, a molecular weight M of a polymer corresponds to a ratio of an amount of a charge monomer m(g) to an amount of a polymerization initiator I(mole). That is, the molecular weight of the polymer M is given by the equation (1):

$$M = m/I \qquad (1)$$

However, in general, it has been difficult to remove completely a polymerization inhibitor which deactivates a polymerization initiator and an active living end from a solvent for polymerization, a monomer for polymerization and a polymerization atmosphere.

In such case, a molecular weight of the polymer M is given by the equation (2):

$$M = m/(I-\alpha) \qquad (2)$$

wherein $\alpha$ (mole) represents an amount of the polymerization inhibitor; which is a sum of $\alpha sa$ of an amount of the polymerization inhibitor remained in the solvent and the atmosphere and $\alpha m$ of an amount of the polymerization inhibitor remained in the monomer.

When an anionic polymerization is carried out in a small scale in a laboratory, the solvent and the monomer used for the polymerization are small enough to attain a complete purification of the solvent and the monomer. A purification process is carried out in high vacuum so as to remove substantially the polymerization inhibitor remained in the solvent and the monomer by repeatedly contacting with a metal hydride hydrate, an alkali metal and an organometallic compound whereby the value $\alpha$ can be remarkably reduced. Therefore, in such case, it is possible to obtain a polymer having a molecular weight being substantially the same with the molecular weight given by the equation (1) so far as the molecular weight is not too high.

On the other hand, in a case of a bench scale or a factory scale of the polymerization, an amount of the solvent is too much to carry out in high vacuum and accordingly, the polymerization is carried out in an inert gas and it is impossible to purify completely the solvent as in high vacuum. The value $\alpha$ can not be negligible in comparison with an amount of the polymerization initiator I. Therefore, a molecular weight of the resulting polymer is higher than a predetermined molecular weight given by the equation (1).

When a predetermined molecular weight of the object polymer is high, such as higher than 500,000, the molecular weight of the resulting polymer is remarkably higher than the predetermined molecular weight given by the equation (1). Sometimes, a polymerization does not proceed.

In a large scale process, it is difficult to maintain constant of the amount of the polymerization inhibitor $\alpha sa$ remained in the solvent and the atmosphere for polymerization in polymerization batches whereby it is difficult to expect a reproducibility on the relation of the predetermined molecular weight and the molecular weight of the resulting polymer.

SUMMARY OF THE INVENTION

It is an object of the present invention to provide a living anionic polymerization process for producing a polymer having a molecular weight being substantially the same with a predetermined one in high productivity.

The foregoing and other objects of the present invention have been attained by polymerizing a monomer for an anionic polymerization in a solvent in the presence of a polymerization initiator by preparing a polymerization system by an operation (I) adding a solution of an organometallic compound in a polymerization system of a solvent or a combination of a solvent and an inert gas and an operation (II) removing excess of the unreacted organometallic compound, before charging the monomer and the polymerization initiator.

DETAILED DESCRIPTION OF THE PREFERRED EMBODIMENTS

In general, the anionic polymerization of the present invention is carried out by purging a reactor for polymerization with an inert gas and charging a predetermined amount of a solvent and stirring thoroughly the polymerization system in an inert gas in the operations (I) and (II).

It is preferably to add excess of the organometallic compound in the operation (I) so as to react completely with the polymerization inhibitor remained in the polymerization system of the solvent or the combination of the solvent and the atmosphere. From the viewpoint of an operation, it is preferable to use a solution of the organometallic compound which is colored, in the present invention.

The process of the present invention will be described in detail in a case using the colored solution of the organometallic compound (hereinafter referring to as a purifying solution).

In the operation (I), the purifying solution is added through a dropping burette until the polymerization system is colored. When the monomer is charged at this stage, excess of the purifying agent may act as a polymerization initiator to perform the polymerization. In order to prevent such trouble, the operation (II) is carried out. A deactivating agent which is easily reacted with the purifying agent is added through a dropping burette until discoloring in the polymerization system. Preferably it is added dropwise to form a just colorless condition, whereby excess of the unreacted purifying agent in the operation (I) can be completely removed. At this point, an amount of the polymerization inhibitor in the polymerization system is substantially zero and a compound for affecting to an initiation of polymerization is not remained. Thus, the monomer for polymerization which is preferably purified and the polymerization initiator are charged at a ratio corresponding to a predetermined molecular weight of the object polymer, whereby the polymerization is initiated.

In a production of a polymer having high molecular weight, an amount of the monomer charged is remarkably smaller than that of the solvent for polymerization. Therefore, the amount $am$ of the polymerization inhibitor in the monomer is far smaller than the amount $asa$ of the polymerization inhibitor in the solvent and the atmosphere for polymerization. Moreover, the amount $am$ can be highly reduced by purifying the monomer in comparison with the amount I of the polymerization initiator. In accordance with the polymerization process of the present invention under reducing the amount $asa$ to substantially zero, it is possible to obtain a polymer having a molecular weight being substantially the same with the molecular weight given by the equation (1). In order to obtain a polymer having a narrow distribution of molecular weights, it is advantageous to reduce an amount of the polymerization inhibitor far from the amount of the polymerization initiator in the polymerization system. The polymerization process of the present invention is suitable for producing a polymer having narrow distribution of molecular weight.

The object of the present invention can be attained by carrying out the operation (I) and then the operation (II).

If the operations (I) and (II) are carried out for the solvent before charging the solvent in the reactor, that is, the solvent in a storage tank, and the treated solvent is charged by a distillation method or a transferring method into the reactor and a polymerization is carried out, the object of the present invention is not substantially attained.

The polymerization process of the present invention can be applied for all of monomers for anionic polymerization.

Suitable monomers include aromatic vinyl compounds such as α-methylstyrene, styrene, p-bromostyrene and vinylnaphthalene; heterocyclic vinyl compounds such as 2-vinylpyridine, 4-vinylpyridine; dienes such as butadiene and isoprene; esters such as acrylates, methacrylates and crotonates; nitriles such as acrylonitrile and methacrylonitrile; cyclic ethers such as ethylene oxide; cyclic thioethers such as ethylene sulfide and propylene sulfide; ketones such as methylvinyl ketone and methylisopropenyl ketone; and isocyanates. It is especially preferable to use a monomer which forms a polymerization system resulting substantially no side reaction especially non-side reaction beside the initiation of polymerization with the polymerization initiator, such as α-methylstyrene, styrene, 2-vinylpyridine, butadiene, isoprene, ethylene oxide and methyl methacrylate.

The monomer is preferably purified by repeatedly purifying with a dehydrating agent in vacuum or in an inert gas and then distilling it, though the purification is not critical in the present invention.

The solvent for polymerization used in the present invention can be any solvent which does not inhibit the anionic polymerization. It is preferable to select from the solvents used in the conventional anionic polymerizations which dissolve the resulting polymer. Suitable solvents include aromatic hydrocarbons and aliphatic hydrocarbons such as benzene, toluene, hexane, heptane and cyclohexane and cyclic ethers such as tetrahydrofuran, tetrahydropyran, and dioxane.

The organometallic compounds used as the polymerization initiator can be compounds having the formula

MeRX wherein Me represents a metal atom in the Groups 1 or 2 of the periodic table such as Li, Na, K, Cs, Be and Mg; and R represents an alkyl or aryl groups or hydrocarbon moiety and x is 1 or 2.

Suitable organometallic compounds include organoalkali metal compounds such as ethyllithium, propyllithium, butyllithium, phenyllithium, phenylisopropylpotassium, carbazylpotassium, potassium α-methylstyrene tetramer and sodium α-methylstyrene tetramer; polynuclear metal complexes of an alkali metal with a polynuclear aromatic compound of naphthalene, anthracene and biphenyl; and organoalkaline earth metal compounds such as diethylberylium and dibutylmagnesium.

The inert gas used for the inert gas atmosphere in the present invention is nitrogen or argon. It is preferable to introduce the inert gas after passing it through a molecular sieve and a solution of an organometallic compound to dehydrate completely.

The organometallic compounds as the purifying agent added to the solvent or the combination of the solvent and the inert gas atmosphere in the operation (1) are preferably compounds which are colored in the absence of a polymerization inhibitor and are discolored by reacting with the deactivating agent in the operation (II).

Suitable organometallic compounds include sodium α-methylstyrene tetramer, potassium α-methylstyrene tetramer, 1,1-diphenylhexyllithium, phenylisopropylpotassium, triphenylmethyl sodium; colored oligomer anions having a polymerization degree of 20 or less preferably 10 or less; and polynuclear metal complexes of an alkali metal with a polynuclear aromatic compound such as biphenyl, benzophenone, fluorene, naphthalene and anthracene.

The solvent dissolving the purifying agent should be inert to the purifying agent and it is not critical and it can be selected from the solvents for polymerization.

The concentration of the solution of the purifying agent is not critical and it is preferably in a range of $10^{-6}$ to $10^{-3}$ mole/ml.

The deactivating agent added in the operation (II) for removing excess of the purifying agent after the operation (I) should be highly reactive to the purifying agent and it is not critical and preferably water or an alcohol.

The solvent for the deactivating agent can be selected from the solvents for polymerization as the solvent for the purifying agent. The concentration of the deactivating agent is preferably at lower than 1/10 preferably lower than 1/100 of the concentration of the purifying solution so as to prevent a remaining of excess of the deactivating agent in the polymerization system after the operation (II).

The temperature in the polymerization process of the present invention is not critical and is preferably lower than 50° C.

The present invention will be further illustrated by certain examples and references which are provided for purposes of illustration only and are not intended to be limiting the present invention.

EXAMPLE 1

As a reactor for a polymerization, a 100 liter round bottom glass flask equipped with a flat joint and ground joint was disposed in a bath made of stainless steel vessel. Argon gas as an inert gas was passed through a molecular sieve-packed column and a solution of butyllithium in toluene to feed into the polymerization system. A pressure in the reactor could be controlled by connecting a liquid paraffin cylinder in the gas inlet system.

The reactor for polymerization was connected to a vessel charging 1.2 kg of isoprene purified with calcium hydride, sodium deposited mirror and potassium-sodium alloy in vacuum as a monomer; a burette charging 15 ml of a solution of sec-butyllithium in hexane ($9.1 \times 10^{-5}$ mole/ml) as a polymerization initiator; a dropping burette charging 10 ml of a solution of 1,1-diphenylhexyllithium in benzene ($2.0 \times 10^{-4}$ mole/ml) as a purifying solution and a dropping burette charging 5 ml of a solution of methyl alcohol in toluene ($1.0 \times 10^{-5}$ mole/ml) as a deactivating solution.

A deaeration and an argon gas feeding were repeated to purge the reactor with argon gas. Benzene was purified by refluxing with sodium metal and then with butyllithium and by distillation. Then 35 liters of benzene thus purified was charged into the reactor under the argon gas pressure. The pressure in the reactor was maintained at 20 mmHg and the purifying solution was added dropwise from the dropping burette with thoroughly stirring the polymerization system by a magnetic stirrer. At the addition of 3.1 ml of the purifying solution, the special red for 1,1-diphenylhexyllithium was found. 0.2 Ml of the purifying solution was further added and the mixture was kept for 30 minutes but no discoloring was found. The deactivating solution was added dropwise from the dropping burette until disappearing red in the system. The amount of the deactivating solution was 2.4 ml. The polymerization initiator solution was added and subsequently isoprene was charged and a polymerization was carried out at 30° C. for 4 hours with thorough stirring and then the polymerization was stopped by adding ethanol.

The results of the polymerization are shown in Table 1 wherein the reference Mk designates a molecular weight calculated by the equation (1) from an amount of a charged monomer and an amount of a charged polymerization initiator; Mw designates a weight average molecular weight determined by light-scattering photometer using tetrahydrofuran as a solvent and 60 designates an amount of an impurity in the polymerization system evaluated by the equation 2 from the values of Mk and Mw.

A ratio of Mw/Mn measured by a gel permeation chromatography (GPC method) was less than 1.1 to confirm the polyisoprene had remarkably narrow molecular weight distribution. The reference Mn designates a number average molecular weight.

EXAMPLES 2 TO 5

In accordance with the process of Example 1 except varying an amount of a charged sec-butyllithium as the polymerization initiator, a polymerization of isoprene was carried out. The conditions and results of the polymerization are shown in Table 1 together with the results of Example 1. As it is clear from Table 1, the values $\alpha$ were quite small in comparison with the amount of the polymerization initiator and were substantially constant in the examples.

From the viewpoint of the values $\alpha$, it is possible to give substantially a predetermined molecular weight even in a preparation of a polyisoprene having high molecular weight.

REFERENCE 1

In accordance with the conventional process, a polymerization of isoprene was carried out. That is, isoprene was polymerized by the process of Example 1 except eliminating the operations (I) and (II), particularly except eliminating the addition of the purifying solution and the addition of the deactivating solution.

The amounts of benzene as a solvent, sec-butyllithium as the polymerization initiator and isoprene as the monomer charged were respectively 35 liters, $1.4 \times 10^{-3}$ mole and 1.2 kg.

The values Mk, Mw and $\alpha$ given by the equation 2 are shown in Table II. The value Mw was remarkably higher than Mk and the effect of the polymerization of the present invention was found.

REFERENCES 2 TO 4

In accordance with the process of Reference 1 except varying an amount of sec-butyllithium charged as the polymerization initiator, a polymerization of isoprene was carried out. The conditions and results of the polymerization are shown in Table II together with the results of Reference 1.

Under the condition of the polymerization in Reference 2, the polymerization did not proceed. The values 60 as the amount of the impurity in the polymerization system were larger than those of the examples shown in Table I and the values $\alpha$ were not constant in these polymerizations. This fact shows that it is difficult to give a predetermined molecular weight in a preparation of a polyisoprene.

EXAMPLE 6

In the reactor for polymerization of Example 1, a polymerization of styrene was carried out.

The reactor was connected to a vessel charging 310 g of styrene purified with calcium hydride, benzophenone and sodium deposited mirror in vacuum as a monomer; a burette charging 20 ml of a solution of n-butyllithium in hexane ($5.2 \times 10^{-6}$ mole/ml) as a polymerization initiator; a dropping burette charging 10 ml of a solution of oligo styryl-anion having average polymerization degree of 3 in benzene ($1.6 \times 10^{-4}$ mole/ml) as a purifying solution and a burette charging a solution of water in tetrahydrofuran ($8.0 \times 10^{-6}$ mole/ml) as deactivating solution.

After deaerating the reactor, 20 liters of tetrahydrofuran obtained by a vacuum distillation from a flask containing tetrahydrofuran dissolving anthracene sodium was fed into the reactor and purified argon was further fed to keep the pressure of 20 mmHg. The reactor was cooled at $-60°$ C., and then, the operations (I) and (II) were carried out by charging $1.3 \times 10^{-4}$ mole of the purifying agent in the operation (I) and $9.6 \times 10^{-6}$ mole of the deactivating agent in the operation (II). Styrene and the polymerization initiator were sequentially charged and the polymerization was carried out at $-60°$ C. for 30 minutes and was stopped. The result of the polymerization was as follows.

Mk $= 2.98 \times 10^6$

Yield $= 100\%$ $Mw = 4.05 \times 10^6$
$\alpha = 2.7 \times 10^{-5}$ mole

The value Mw was determined by a light-scattering photometer using benzene as a solvent. The ratio of Mw/Mn determined by the GPC method was less than 1.05.

REFERENCE 5

In accordance with the conventional process, a polymerization of styrene was carried out. That is, styrene was polymerized by the process of Example 6 except eliminating the operations (I) and (II). The polymerization did not proceed to give a yield of zero.

EXAMPLE 7

In accordance with the process of Example 6, a polymerization of styrene was carried out in vacuum in the absence of an inert gas by charging 20 liters of tetrahydrofuran by a vacuum distillation and using a solution of triphenylmethyl sodium in tetrahydrofuran ($1.2 \times 10^{-4}$ mole/ml) as the purifying solution in the operation (I) and a solution of water in tetrahydrofuran ($8.0 \times 10^{-6}$ mole/ml) as the deactivating solution in the operation (II).

The amounts of the purifying agent and the deactivating agent were respectively $2.1 \times 10^{-4}$ mole and $8.6 \times 10^{-6}$ mole. 400 Grams of styrene and 19.5 ml of a solution of sodium naphthalene in tetrahydrofuran ($3.4 \times 10^{-5}$ mole/ml) as the polymerization initiator were sequentially charged and the polymerization was carried out at $-60°$ C. for 1 hour. The result of the polymerization was as follows.

$Mk = 1.21 \times 10^6$
Yield $= 100\%$
$Mw = 1.30 \times 10^6$
$\alpha = 4.8 \times 10^{-5}$ mole

EXAMPLE 8

In accordance with the process of Example 7 a polymerization of methyl methacrylate was carried out by charging 18 liters of tetrahydrofuran as the solvent and 300 g of methyl methacrylate purified with calcium hydride and sodium benzyl and $2.0 \times 10^{-4}$ mole of triphenylmethylsodium as the purifying agent and $4.5 \times 10^{-6}$ mole of water as the deactivating agent, and charging further 36.0 ml of a solution of sodium biphenyl in tetrahydrofuran ($1.8 \times 10^{-5}$ mole/ml) as the polymerization initiator, at $-70°$ C. for 1 hour. The result of the polymerization was as follows.

$Mk = 9.3 \times 10^5$
Yield $= 100\%$
$Mw = 1.2 \times 10^6$
$\alpha = 1.5 \times 10^{-4}$ mole

REFERENCE 6

In accordance with the conventional process, a polymerization of methyl methacrylate was carried out. That is, in accordance with the process of Example 8 except eliminating the operations (I) and (II), a polymerization of methyl methacrylate was carried out by charging 320 g of methyl methacrylate and $5.9 \times 10^{-4}$ mole of sodium biphenyl as the polymerization initiator. However, the polymerization was not performed to give a yield of zero.

EXAMPLE 9

In accordance with the process of Example 6, a polymerization of ethylene oxide was carried out by charging 15 liters of tetrahydrofuran as the solvent and 610 g of ethylene oxide purified with calcium hydride and sodium deposited mirror and $3.5 \times 10^{-4}$ mole of 1,1-diphenylhexyllithium as the purifying agent and $1.2 \times 10^{-5}$ mole of water as the deactivating agent and 24.5 ml of a solution of carbazyl potassium in tetrahydrofuran ($8.2 \times 10^{-5}$ mole/ml) as the polymerization initiator, at $35°$ C. for 24 hours. The result of the polymerization was as follows.

$Mk = 3.0 \times 10^5$
Yield $= 92\%$
$Mw = 2.9 \times 10^5$
$\alpha = 0.6 \times 10^{-4}$ mole

TABLE I

| Example | 1 | 2 | 3 | 4 | 5 |
|---|---|---|---|---|---|
| Charged Amount | | | | | |
| Benzene (liter) | 35 | 35 | 35 | 30 | 40 |
| Purifying agent $\times 10^{-4}$ mole | 6.4 | 8.2 | 4.6 | 9.2 | 4.8 |
| Deactivating agent $\times 10^{-5}$ mole | 2.4 | 1.6 | 2.4 | 2.6 | 1.9 |
| Sec-butyllithium $\times 10^{-4}$ mole | 13.6 | 6.2 | 10.2 | 25.0 | 5.0 |
| Isoprene (kg) | 1.2 | 1.1 | 1.2 | 1.2 | 1.2 |
| Yield (%) | 100 | 100 | 100 | 100 | 100 |
| Mk $\times 10^5$ | 8.8 | 17.7 | 11.8 | 4.8 | 24.0 |
| Mw $\times 10^5$ | 9.4 | 20.0 | 13.1 | 4.9 | 28.7 |
| $\alpha \times 10^{-4}$ mole | 0.8 | 0.7 | 1.0 | 0.6 | 0.8 |

TABLE II

| Reference | 1 | 2 | 3 | 4 |
|---|---|---|---|---|
| Charged Amount | | | | |
| Benzene (liter) | 35 | 35 | 30 | 35 |
| Sec-butyllithium $\times 10^{-4}$ mole | 14.0 | 6.1 | 30.0 | 9.6 |
| Isoprene (kg) | 1.2 | 1.0 | 1.2 | 1.2 |
| Yield (%) | 100 | 0 | 100 | 100 |
| Mk $\times 10^5$ | 8.6 | 16.4 | 4.0 | 12.5 |
| Mw $\times 10^5$ | 16.0 | — | 6.1 | 31.0 |
| $\alpha \times 10^{-4}$ mole | 6.5 | >6.1 | 10.4 | 5.7 |

What is claimed is:

1. In a process for polymerizing a prepurified monomer by anionic polymerization in a solvent in the presence of a polymerization inhibitor, the improvement comprising:

(I) removing said polymerization inhibitor from the polymerization system by adding to a prepurified solvent in said system a solution of an organometallic compound which is colored in the absence of said polymerization inhibitor in a polymerization solvent, said polymerization initiator being a compound of the formula: MeR$_x$, wherein Me is a metal of Group I or II of the Periodic Chart; R is a hydrocarbon moiety and x is 1 or 2; and (II) deactivating excess unreacted organometallic compound with water, an alcohol or mixture thereof, before introducing said monomer and polymerization initiator into said system.

2. The polymerization process according to claim 1 wherein the organometallic compound at least is one compound selected from the group consisting of sodium α-methylstyrene tetramer, potassium, α-methylstyrene tetramer, 1,1-diphenylhexyllithium, phenylisopropylpotassium, triphenylmethylsodium, oligomer anions having a polymerization degree of 20 or less and polynuclear metal complexes of an alkali metal with a polynuclear aromatic compound of biphenyl, benzophenone, fluorene, naphthalene and anthracene.

3. The polymerization process according to claim 1 or 2, wherein the anionic polymerizable monomer is selected from the group consisting of aromatic vinyl compounds, heterocyclic vinyl compounds, dienes, unsaturated-nitriles, esters, cyclic ethers, cyclic thioethers and ketones.

4. The polymerization process according to claim 3 wherein the aromatic vinyl compound is α-methylstyrene, styrene, p-bromostyrene or vinyl naphthalene.

5. The polymerization process according to claim 3 wherein the heterocyclic compound is 2-vinylpyridine or 4-vinylpyridine.

6. The polymerization process according to claim 3 wherein the diene compound is butadiene or isoprene.

7. The polymerization process according to claim 3 wherein the ester is an acrylic acid ester, a methacrylic acid ester or a crotonic acid ester.

8. The polymerization process according to claim 3 wherein the nitrile is acrylonitrile or methacrylonitrile.

9. The polymerization process according to claim 3 wherein the cyclic ether is ethylene oxide.

10. The polymerization process according to claim 3 wherein the cyclic thioether is ethylenesulfide or propylenesulfide.

11. The polymerization process according to claim 3 wherein the ketone compound is methyl vinyl ketone or methyl isopropenyl ketone.

12. The polymerization process according to claim 5, wherein the solvent is selected from the group consisting of aromatic hydrocarbons, aliphatic hydrocarbons and cyclic ethers.

13. The polymerization process according to claim 1 wherein the organometallic compound is selected from the group consisting of ethyllithium, propyllithium, butyllithium, phenyllithium, phenylisopropylpotassium, potassium α-methylstyrene tetramer, sodium α-methylstyrene tetramer, diethylberyllium, dibutylmagnesium and polynuclear metal complexes of an alkali metal with a polynuclear aromatic compound of naphthalene, anthracene and biphenyl.

14. The polymerization process according to claim 1 wherein the inert gas is nitrogen or argon gas.

15. The polymerization process according to claim 1 wherein step (I) is carried out in the presence of an inert gas.

* * * * *